United States Patent [19]

Kolts

[11] Patent Number: 4,921,830

[45] Date of Patent: May 1, 1990

[54] CATALYST FOR THE OXIDATION OF CARBON MONOXIDE

[75] Inventor: John H. Kolts, Ochelata, Okla.

[73] Assignee: Phillips Petroleum Company, Bartlesville, Okla.

[21] Appl. No.: 181,021

[22] Filed: Apr. 13, 1988

[51] Int. Cl.$^5$ .................. B01J 21/06; B01J 23/42; B01J 23/44; B01J 23/89
[52] U.S. Cl. ............................................. 502/326
[58] Field of Search ................... 502/326, 339

[56] References Cited

U.S. PATENT DOCUMENTS

| | | | |
|---|---|---|---|
| 3,224,981 | 12/1965 | Stephens et al. | 252/460 |
| 3,288,558 | 11/1966 | Briggs et al. | 23/2 |
| 3,615,166 | 10/1971 | Hindin et al. | 502/339 X |
| 3,794,588 | 2/1974 | Stiles | 252/462 |
| 3,873,469 | 3/1975 | Foster et al. | 252/455 R |
| 3,909,452 | 9/1975 | Acres | 252/455 R |
| 4,197,217 | 4/1980 | Gartshore | 252/466 J |
| 4,252,687 | 2/1981 | Dale et al. | 252/455 Z |
| 4,294,726 | 10/1981 | Bozon et al. | 252/462 |
| 4,297,245 | 10/1981 | Bartley et al. | 252/460 |
| 4,299,734 | 11/1981 | Fujitani et al. | 252/462 |
| 4,316,822 | 2/1982 | Fujitani et al. | 252/462 |
| 4,374,047 | 2/1983 | Bozon et al. | 252/472 |
| 4,388,277 | 6/1983 | Wright | 422/211 |
| 4,492,770 | 1/1985 | Blanchard et al. | 502/304 |
| 4,524,051 | 6/1985 | Wright et al. | 423/247 |
| 4,572,904 | 2/1986 | Onal | 502/333 |
| 4,621,071 | 11/1986 | Blanchard et al. | 502/302 |
| 4,719,197 | 1/1988 | Vogt et al. | 502/339 |

FOREIGN PATENT DOCUMENTS 2028571 6/1979 United Kingdom .

OTHER PUBLICATIONS

"Celcor ® Honeycomb Ceramic Catalyst Supports", Product Brochure of Corning Glass Works, Corning, NY.

*Primary Examiner*—W. J. Shine
*Attorney, Agent, or Firm*—K. K. Brandes

[57] ABSTRACT

A composition of matter comprising zirconia and Pt and/or Pd is prepared by a process comprising one step of treating Pt- and/or Pd-impregnated zirconia with a reducing gas, in particular free hydrogen, at a temperature of about 100°–600° C. Another composition of matter comprising zirconia and Pt and/or Pd is prepared by a process comprising the steps of impregnating a porous ceramic material (preferably a monolith) with a Zr compound, substantially decomposing the Zr compound to $ZrO_2$, impregnating with Pt and/or Pd, drying/calcining, and reducing with a reducing gas, in particular free hydrogen, at a temperature of about 0°–400° C. Both compositions of matter are used as catalysts in a process for oxidizing CO to $CO_2$, e.g. in a $CO_2$ laser. Preferably, at least one iron compound is present as copromoter in these compositions of matter.

80 Claims, No Drawings

CATALYST FOR THE OXIDATION OF CARBON MONOXIDE

BACKGROUND OF THE INVENTION

This invention relates to the oxidation of carbon monoxide to carbon dioxide. In another aspect, this invention relates to the catalytic oxidation of carbon monoxide, in particular under conditions suitable for laser applications. In a further aspect, this invention relates to effective CO oxidation catalyst compositions. In still another aspect, this invention relates to a process for preparing CO oxidation catalyst compositions.

The use of catalysts for the oxidation of carbon monoxide to carbon dioxide by reaction with oxygen, in particular at low temperature, is of much interest, e.g., in breathing masks designed to remove CO from inhaled air, and in $CO_2$ lasers for combining CO and $O_2$ formed by dissociation of $CO_2$ during discharge. In the latter application, the presence of $O_2$ is most undesirable because it can cause a breakdown of the electrical field in the laser cavity. Several patents, such as U.S. Pat. Nos. 4,490,482 and 4,639,432, disclose compositions useful as CO oxidation catalysts in $CO_2$ laser applications. However, there is an ever present need to develop new, effective CO oxidation catalyst compositions and/or improved processes for preparing effective CO oxidation catalyst compositions.

SUMMARY OF THE INVENTION

It is an object of this invention to provide a composition of matter which is effective as a catalyst for the oxidation of carbon monoxide with free oxygen. It is another object to provide a process for preparing a composition of matter which is effective as a catalyst for the oxidation of carbon monoxide. It is a further object of this invention to provide an effective process for catalytically oxidizing carbon monoxide. Other objects and advantages will be apparent from the detailed description and the claims.

In accordance with this invention, a process for preparing a composition of matter comprising Pt and/or Pd and $ZrO_2$ (suitable and effective as a catalyst composition for the oxidation of carbon monoxide by reaction with free oxygen) comprises the steps of:

(a) contacting (preferably impregnating) a support material comprising (preferably consisting essentially of) zirconium dioxide (zirconia; $ZrO_2$) with a solution comprising at least one dissolved compound of at least one noble metal selected from the group consisting of platinum and palladium (preferably Pt);

(b) heating the material obtained in step (a) under such conditions as to substantially dry said material obtained in step (a) and to at least partially (preferably substantially) convert said at least one compound of Pt and/or Pd to at least one of oxides of Pt, oxides of Pd, Pt metal and Pd metal; and (c) treating the material obtained in step (b) with a reducing gas (preferably free hydrogen or carbon monoxide) at a temperature in the range of from about 100° to about 600° C., under such conditions as to activate said material obtained in step (b), i.e, to make the material obtained in step (b) more active as a catalyst for CO oxidation by reaction with $O_2$.

In a preferred embodiment, heating step (b) is carried out in two sub-steps: (b1) heating the material obtained in step (a) at a first temperature so as to remove substantially all liquids from said material obtained in step (a), and (b2) heating (calcining) the substantially dried material obtained in step (b1) at a second temperature, which is higher than said first temperature, so as to at least partially (preferably substantially) convert said at least one compound of Pt and/or Pd to at least one of oxides of Pt, oxides of Pd, metallic Pt and metallic Pd (i.e., Pt oxide and/or Pd oxide and/or Pt metal and/or Pd metal).

In another preferred embodiment, the solution used in step (a) additionally comprises at least one dissolved compound of iron which is at least partially (preferably substantially) converted to iron oxide in step (b). In a further preferred embodiment, manganese compounds and silica are substantially absent from the material obtained in step (c).

In a further preferred embodiment, a process for preparing a composition of matter comprising Pt and/or Pd and $ZrO_2$ (effective as a CO oxidation catalyst composition) comprises the step of:

(A) impregnating a porous ceramic material (more preferably monolith material) with a solution of a suitable zirconium compound (preferably dissolved in water), (B) heating the impregnated material obtained in step (A) under such conditions as to substantially decompose said zirconium compound to zirconia and to obtain a substantially dried zirconia-coated porous ceramic material;

(C) contacting (preferably impregnating) the zirconia-coated porous ceramic material obtained in step (B) with a solution (preferably aqueous) comprising at least one dissolved compound of at least one noble metal selected from the group consisting of platinum and palladium (preferably Pt);

(D) heating the material obtained in step (C) under such conditions as to substantially dry the material obtained in step (C) and to at least partially (preferably substantially) convert said at least one compound of Pt and/or Pd to at least one of oxides of Pt, oxides of Pd, Pt metal and Pd metal; and (E) treating the material obtained in step (D) with a reducing gas, preferably a free hydrogen containing gas, more preferably a stream of $H_2$, at a temperature in the range of from about 0° C. to about 400° C., under such conditions as to activate said material obtained in step (D), i.e., to make it more active as a CO oxidation catalyst.

The impregnation step (A) can be carried out once or twice or more than twice in sequence, so as to ensure adequate impregnation of the monolith with the Zr compound. Step (D) can be carried out as a sequence of sub-steps: drying sub-step (D1) and calcining sub-step (D2). The conditions of calcining sub-step (D2) is substantially the same as those of calcining sub-step (b2), described above.

Also in accordance with this invention, there is provided a composition of matter (useful and effective as a catalyst composition for the oxidation of CO with $O_2$), comprising (i) a support material comprising zirconia and (ii) at least one noble metal selected from the group consisting of Pt and Pd; said composition of matter having been prepared by the process comprising steps (a), (b) and (c), as defined above; or, alternatively, steps (A), (B), (C), (D) and (E), as defined above. Preferably said composition of matter further comprises (iii) at least one iron compound (more preferably iron oxide).

In a more preferred embodiment, the composition of matter of this invention consists essentially of components (i), (ii) and (iii). In another preferred embodiment, manganese compounds and silica or substantially absent from the composition of matter of this invention.

Further in accordance with this invention, a process for oxidizing carbon monoxide comprises contacting a gas comprising CO and $O_2$ with a catalyst composition comprising zirconia and at least one of Pt and Pd; said catalyst composition having been prepared by a process comprising steps (a), (b) and (c), as defined above, or, alternatively, (A), (B), (C), (D) and (E), as defined above; under such reaction (contacting) conditions as to at least partially (preferably substantially) convert CO and $O_2$ to $CO_2$.

Preferably, in the CO oxidation in process of this invention the catalyst composition of this invention (described above) additionally comprises component (iii), as defined above, preferably iron oxide (e.g., FeO and/or $Fe_2O_3$ and/or $Fe_3O_4$). Also preferably, manganese compounds and silica are substantially absent from the catalyst composition. In one embodiment, the CO oxidation process of this invention is carried out at a temperature of below 300° C. (preferably at about −50° C. to about 300° C.). In another preferred embodiment, the CO oxidation process is carried out in a $CO_2$ laser so as to recombine CO and $O_2$, which have been formed by decomposition of $CO_2$.

DETAILED DESCRIPTION OF THE INVENTION

Any zirconia-containing support material can be used as the support material (i). Zirconia is the preferred support material, and is commercially available. The method of preparation of zirconia is not considered critical. Zirconia can be prepared by flame hydrolysis of volatile zirconium compounds; or by precipitation from an aqueous solution of zironium compounds with an alkaline reagent, followed by washing, drying and calcining; and the like. If zirconia contains alumina or other refractory oxides, generally less than about 10, preferably less than 5 weight- % of alumina or said refractory oxides are present. Preferably, silica is substantially absent from the support material (i.e., silica should not be present at a level higher than about 1 weight- %).

Generally the surface area (determined by nitrogen adsorption in accordance with the BET method; substantially in accordance to ASTM D3037) of zirconia is in the range of from about 10 to about 300 m$^2$/g. Zirconia can have spherical, trilobal, quadrilobal or irregular shapes. When zirconia spheres are used, their diameter generally is in the range of from about 0.5 to about 5 mm.

It is within the scope of this invention to prepare suitable zirconia-containing support materials by coating a porous ceramic material, such as a glass frit, sintered alumina, or a honeycomb ceramic material, and the like, preferably a monolith (commercially available from Corning Glass Works, Corning, N.Y., described in U.S. Pat. Nos. 4,388,277 and 4,524,051) with zirconia. The porous material can be impregnated with dissolved inorganic or organic compounds of Zr, such as a ZrO($NO_3$)$_2$, dried and calcined. Or the porous material can be impregnated with a colloidal solution of hydrated zirconia, followed by drying and calcining.

In a preferred embodiment of this invention, a porous ceramic material, preferably a monolith, is impregnated with an aqueous solution of a zirconium compound in step (A). Generally, the concentration of the Zr compound in the solution is in the range of from about 0.1 to about 30, preferably from about 5 to about 20, weight percent Zr. The weight ratio of the Zr compound to the porous ceramic in step (A) is chosen so as to provide a $ZrO_2$ content of the material obtained in step (B) in the range of from about 1 to about 40 weight- % $ZrO_2$, preferably about 5 to about 30 weight- % $ZrO_2$.

The impregnation of the zirconia-containing support material with Pt and/or Pd (preferably Pt) in step (a) or, alternatively, step (C) can be carried out in any suitable manner. First, compounds of Pt and/or Pd are dissolved in a suitable solvent (preferably water) so as to prepare solutions of suitable concentration, generally containing from about 0.005 to about 0.20, preferably about 0.01 to about 0.1, g Pt and/or Pd per cc of solution. Non-limiting examples of suitable compounds of Pt and Pd are: $PtCl_2$, $PtCl_4$, $H_2PtCl_6$, $PtBr_4$, $Pt(NH_3)_4Cl_2$, $Pt(NH_3)_4(NO_3)_2$ and the like; $PdCl_2$, $PdCl_4$, $H_2PdCl_6$, $Pd(NH_3)_4(NO_3)_2$ and the like; preferably (at present) $Pt(NH_3)_4(NO_3)_2$ and $Pd(NH_3)_4(NO_3)_2$. The $ZrO_2$-containing support material is then impregnated by soaking it in the solution of Pt and/or Pd compounds; or (less preferably) the Pt and/or Pd containing solution is sprayed onto the support material. The ratio of Pt and/or Pd containing solution to support material generally is such that the final catalyst obtained in step (c) or, alternatively, the coating of the material obtained in (E), i.e., the material obtained in step (E) excluding the monolith, contains about 0.5 to about 5, preferably about 1 to about 3, weight- % Pt or Pd. When a solution containing both Pt and Pd compounds, the level of Pt and Pd generally is about 0.5 to about 5, preferably about 1 to about 3, weight percent (Pt+Pd).

In a preferred embodiment, at least one compound of iron is also present as a copromoter in the impregnating solution (besides Pt and/or Pd). Non-limiting examples of suitable Fe compounds that can be used as solutes are $FeCl_2$, $FeCl_3$, $Fe_2(SO_4)_3$, $Fe(NO_3)_2$, $Fe(NO_3)_3$ and the like, preferably compounds of Fe in the valence state +3, more preferably $Fe(NO_3)_3$. Generally, the concentration of the Fe copromoter compound (expressed as metal) in the impregnating solution is in the range of from about 0.01 to about 0.4, preferably about 0.02 to about 0.2, g Fe per cc solution. The impregnation of the support material with Pt and/or Pd and Fe (as copromoter) can be carried out either by sequential impregnation (first Pt and/or Pd, then Fe; or vice versa) or by simultaneous impregnation in step (a) or, alternatively, step (C) (using a solution containing Pt and/or Pd compounds and at least one Fe compound).

When sequential impregnation is employed, the impregnation with a solution of at least one Fe compound is preferably carried out after heating step (b) and before step (c); or, alternatively after heating step (D) and before step (E). Thus, an impregnating step (a*) with at least one dissolved Fe compound and heating step (b*) [carried out in substantially the same manner as step (b)] are performed after step (b) and before step (c). Similarly, an impregnation step (C*) with at least one dissolved Fe compound and heating step (D*) [carried out in substantially the same manner as step (D)] are performed after step (D) and before step (E).

The ratio of the Fe containing solution to the zirconia-containing support material is such as to provide a level of about 0.2 to about 4, preferably about 0.5–2, weight percent Fe (expressed as metal), based on the weight of the material obtained in step (c) or, alternatively, based on the weight of the coating of the material obtained in step (E), i.e., excluding the weight of the porous ceramic material (preferably monolith). Generally, Fe is present as iron oxide.

Preferably compounds of manganese and of silicon substantially absent from the impregnating solutions used in impregnation steps (a), (a*), (C) and (C*), respectively, since these compounds have a detrimental effect on the activity for CO oxidation of the finished catalyst.

Heating step (b) is generally carried out in an inert or oxidizing atmosphere, preferably a free oxygen containing gas atmosphere (such as air), generally at a temperature ranging from about 30 to about 700° C. Preferably, heating step (b) is carried out in two sequential substeps: sub-step (b1), at about 30° to about 200° C. (preferably at 80°–130° C.), generally for about 0.5 to about 10 hours, so as to substantially dry the impregnated material obtained in step (a) (preferably under such conditions as to reduce the level of adhered and accluded water to less than about 20 weight-%); and sub-step (b2), at about 300° to about 700° C. (preferably about 400° to about 600° C.), generally for about 1 to about 20 hours, under such conditions as to substantially calcine the impregnated support material so as to obtain oxide of Pt and/or Pd, on zirconia. When at least one compound of iron has been present in the Pt and/or Pd-containing impregnating solution, generally at least one oxide of iron is formed in step (b2).

Heating steps ((b*), (D) and (D*), described above, are generally carried out at conditions which are essentially the same as those described for step (b), preferably as a sequence of a drying sub-step and a calcining substep, as described above.

Reducing step (c) can be carried out in any suitable manner at a temperature in the range of from about 100° to about 600° C., preferably from about 300° to about 500° C. Reducing step (E) can be carried out in any suitable manner at a temperature in the range of from about 0 to about 400° C., preferably about 20° to about 200° C. Any reducing gas can be employed in reducing steps (c) and (E), such as a gas comprising $H_2$, CO, gaseous hydrocarbons such as methane, mixtures of the above, and the like. Preferably, a free hydrogen containing gas, more preferably substantially pure $H_2$, is employed. Reducing steps (c) and (E) can be carried out for any suitable period of time suitable to activate the calcined material obtained in the previous step, preferably from about 0.5 to about 20 hours.

The process for oxidizing a carbon monoxide containing feed gas can be carried at any suitable temperature and pressure conditions, for any suitable length of time, at any suitable gas hourly space velocity, and any suitable volume ratio of CO and $O_2$. The reaction temperature preferably is in the range of from about −50° to about 300° C., more preferably from about 0° to about 150° C., most preferably from about 20° to about 100° C. The pressure during the oxidation process generally is in the range of from about 1 to about 2,000 psia, more preferably from about 5 to about 20 psia. The volume ratio of CO to $O_2$ in the feed gas can range from about 1:100 to about 100:1, and preferably is in the range of about 1:10 to about 10:1. The volume percentage of CO and the volume percentage of $O_2$ in the feed gas can each be in the range of from about 0.05 to about 50, preferably from about 0.1 to about 3. The gas hourly space velocity (cc feed gas per cc catalyst per hour) can be in the range of from about 0.5 to about 10,000, preferably from about 1 to about 1,000. It is understood that the calculation of the gas hourly space velocity is based on the volume of the active catalyst i.e., the zirconia-supported Pt and/or Pd catalyst (optionally also containing Fe as copromoter), excluding the volume occupied by any additional support material, such as a monolith material.

The feed gas can be formed in any suitable manner, e.g., by mixing CO, $O_2$ and optionally other gases such as $CO_2$, $N_2$, He and the like, such as in a carbon dioxide laser cavity. Or the feed gas can be an exhaust gas from a combustion engine, or it can be air that is to be inhaled by humans and contains undesirable levels of toxic carbon monoxide, and the like. The feed gas can be contacted in any suitable vessel or apparatus, such as in a laser cavity or in an exhaust pipe of a combustion engine, or in a gas mask used by humans, wherein the feed gas passes over the catalyst composition of this invention at the conditions described above. The CO oxidation process of this invention can be carried out in any suitable setting and for any purpose, e.g., for recombining CO and $O_2$ $CO_2$ lasers, to oxidize CO contained in exhaust gases or air, to make isotopically labeled $CO_2$ from CO and the $_8{}^{18}O$ isotope, and the like.

The following examples are presented in further illustration of the invention and are not to be construed as unduly limiting the scope of the invention.

EXAMPLE I

This example illustrates the experimental setup for testing the activity of noble metal catalysts for catalyzing the oxidation of carbon monoxide (so as to simulate catalytic recombination of CO and $O_2$ in $CO_2$ lasers). A gaseous feed blend comprising CO, $O_2$, He, $CO_2$ and $N_2$ was passed through a needle valve and a glass reactor in an upflow direction. The glass reactor tube had an inner diameter of about 6 mm and generally contained about 1.0 gram catalyst in a bed of about 2.5 cm height. The temperature in the catalyst bed was measured by means of a thermocouple inserted into the top layer of the catalyst bed. The CO content in the reactor effluent was determined by means of a Beckman Model 864 IR analyzer.

All tests were carried out at ambient conditions (about 25°–30° C.). The feed rate of the gaseous stream generally was about 160–300 cc/minute. The feed gas contained 1.2–1.3 volume-% CO, 0.6 volume-% $O_2$, 32 volume-% $CO_2$, 32 volume-% He, and $N_2$ as the remainder.

EXAMPLE II

This example illustrates the preparation and performance of various zirconia-supported catalyst compositions.

Catalyst A was prepared by mixing 5 grams of pellets containing 98 weight-% $ZrO_2$ and 2 weight-% $Al_2O_3$ and having an average particle diameter of about 3.2 mm (provided by the Alfa Products division of Morton-Thiokol, Danver, MA; lot number 11079) was impregnated with about 2.5 cc of an aqueous solution of $Pt(NH_3)_4(NO_3)_2$, and $Fe(NO_3)_3$ containing 0.02 g Pt per cc solution and 0.0056 g Fe per cc solution. The thus impregnated zirconia material was dried at 125° C., and impregnated again with about 2.5 cc of the above-described Pt/Fe solution. The thus twice-impregnated zirconia material was calcined in air at 300° C. for 2 hours and then heated in carbon monoxide at 200° C. for 1 hour. Catalyst A contained 2.0 weight-% Pt and 0.56 weight-% Fe.

Catalyst B contained 2.5 weight-% Pt, 0.7 weight-% Fe, and zirconia support material. Catalyst B was prepared by impregnating 5 grams of Alfa Products zirconia pellets (98 weight-% $ZrO_2$, 2 weight-% $Al_2O_3$; described above) with 3 cc of the above-described aqueous Pt/Fe impregnating solution (containing 0.02 g/cc Pt and 0.0056 g/cc Fe) heating the thus obtained Pt/Fe-impregnated zirconia material in air at 400° C. and then in $H_2$ at 400° C. for 1 hour, impregnating the thus heated Pt/Fe/$ZrO_2$ material again with 3.3 cc of the above aqueous Pt/Fe impregnating solution, heating the thus twice impregnated material in air at 400° C. for 2 hours and then in $H_2$ at 200° C. for 1 hour.

Catalyst C contained 2.5 weight-% Pt, 2.5 weight-% Pd, 0.7 weight-% Mn, and zirconia support material. Catalyst C was prepared by impregnating 5 grams of Alfa Products zirconia pellets (described above) with Pt (using 3 cc of an aqueous solution of $Pt(NH_3)_4(NO_3)_2$ containing 0.018 g/cc Pt), drying in air at 125° C., impregnating the Pt-impregnated material with Pd (using 3 cc of an aqueous solution of $Pd(NH_3)_4(NO_3)_2$ containing 0.018 g/cc Pd), drying in air at 125° C., impregnating the Pt/Pd-impregnated material with Mn (using 3 cc of an aqueous solution of a manganese salt containing 0.005 g/cc Mn), calcining in air at 400° C. for 2 hours and heating in $H_2$ at 400° C. for 1 hour. The impregnation with Pt, Pd and Mn was repeated, substantially as described immediately above except that 4 cc of each solution was applied. The thus twice Pt/Pd/Mn-impregnated zirconia material was heated in air at 400° C. for 2 hours and then in $H_2$ at 200° C. for 1 hour.

Catalysts A, B and C, were then tested, at about 27° C. and a gas feed rate of 160 cc/minute, in accordance with the procedure described in Example I. Test results are summarized in Table I.

TABLE I

| Run | Catalyst | Run Time (Hours) | % Conversion of CO | Conversion of CO in cc CO per Minute |
|---|---|---|---|---|
| 1 | A | 1 | 56.8 | 1.072 |
| | | 2 | 54.2 | 1.024 |
| | | 3 | 50.8 | 0.960 |
| | | 4 | 50.0 | 0.960 |
| | | 5 | 50.0 | 0.944 |
| | | 6 | 49.2 | 0.928 |
| | | 7 | 47.4 | 0.894 |
| | | 8 | 44.9 | 0.848 |
| | | 9 | 42.4 | 0.800 |
| | | 10 | 40.7 | 0.768 |
| | | 12 | 38.1 | 0.720 |
| | | 14 | 35.6 | 0.672 |
| | | 16 | 32.2 | 0.608 |
| | | 18 | 32.2 | 0.608 |
| | | 20 | 35.6 | 0.672 |
| | | 22 | 38.1 | 0.720 |
| | | 24 | 39.8 | 0.752 |
| 2 | B | 1 | 67.8 | 1.280 |
| | | 2 | 65.3 | 1.232 |
| | | 3 | 62.7 | 1.184 |
| | | 4 | 60.2 | 1.136 |
| | | 5 | 58.5 | 1.104 |
| | | 6 | 58.5 | 1.104 |
| | | 7 | 56.8 | 1.072 |
| | | 8 | 55.1 | 1.040 |
| | | 9 | 54.2 | 1.024 |
| | | 10 | 54.2 | 1.024 |
| | | 12 | 54.2 | 1.024 |
| | | 14 | 53.6 | 1.008 |
| | | 16 | 52.5 | 0.992 |
| | | 18 | 51.7 | 0.976 |

TABLE I-continued

| Run | Catalyst | Run Time (Hours) | % Conversion of CO | Conversion of CO in cc CO per Minute |
|---|---|---|---|---|
| | | 20 | 51.7 | 0.976 |
| | | 22 | 52.5 | 0.992 |
| | | 24 | 53.4 | 1.008 |
| 3 | C | 1 | 11.9 | 0.224 |
| | | 2 | 5.1 | 0.096 |
| | | 3 | 4.2 | 0.080 |

Test results listed in Table I show that Catalyst B prepared by multiple impregnation with Pt/Fe, intermittent calcination/reduction, and final reduction with hydrogen gas was considerably more active than Catalyst A, prepared by single impregnation with Pt/Fe and final reduction with carbon monoxide. Furthermore, the test data show that the combination of Pt, Pd and Mn and zirconia was not a very active CO oxidation catalyst at room temperature. It is concluded that Mn is a detrimental component and should preferably be substantially absent from the catalyst composition.

EXAMPLE III

This example illustrates a monolith-supported zirconia catalyst, labeled Catalyst D, and its performance in the catalytic oxidation of carbon monoxide. Catalyst D was prepared as follows:

A round piece of Celcor® Cordierite #9475 monolith ceramic material ($2MgO·2Al_2O_3·5SiO_2$; provided by Corning Glass Works, Corning N.Y.; weight: 5 grams; diameter: 1 inch; height: 1 inch; having 100 cells per square inch) was dried for 2 hours at 185° C., and was then soaked several times with an aqueous solution of $ZrO(NO_3)_2$ containing about 10 weight-% Zr. The thus impregnated monolith material was dried at 125° C. after each soaking step and then calcined in air at 350° C. for about 1 hour. The calcined $ZrO_2$-coated monolith material (comprising 5 g monolith and 2.2 g $ZrO_2$) was then impregnated with an aqueous solution of $Pt(NH_3)_4(NO_3)_2$ and $Fe(NO_3)_3$ containing 0.018 g/cc Pt and 0.0056 g/cc Fe. The thus impregnated material was calcined in air at about 400° C. for about 2 hours, and then heated in hydrogen at 175° C. for 1 hour. Catalyst D contained 2.2 weight-% Pt and 0.7 weight-% Fe, based on the weight of the zirconia-containing coating (i.e., excluding the weight of the monolith support).

Catalyst D was tested, at about 27° C., about 1 atm., and a gas feed rate of 300 cc/minute, in accordance with the procedure described in Example I. Test results are summarized in Table II.

TABLE II

| Run | Catalyst | Run Time (Hours) | % Conversion of CO | Conversion of cc CO per Minute |
|---|---|---|---|---|
| 4 | D | 1 | 55.1 | 1.950 |
| | | 2 | 44.1 | 1.560 |
| | | 3 | 41.5 | 1.470 |
| | | 4 | 41.5 | 1.470 |
| | | 5 | 35.6 | 1.260 |
| | | 6 | 25.4 | 0.900 |
| | | 7 | 22.9 | 0.810 |
| | | 8 | 22.0 | 0.780 |
| | | 9 | 20.3 | 0.720 |
| | | 10 | 20.3 | 0.720 |
| | | 12 | 20.3 | 0.720 |

Test data in Table II show that the monolith-supported Pt/Fe/$ZrO_2$ material was quite active as catalyst for oxidizing carbon monoxide at ambient condition (about 27° C., 1 atm.).

EXAMPLE IV

This example illustrates the regeneration of a Pt/Fe/ZrO$_2$ catalyst. Catalyst E was prepared substantially in accordance with the procedure for Catalyst B except that Catalyst E contained 3.0 weight-% Pt and 0.75 weight-% Fe. Catalyst E was tested at about 27° C., 1 atm, and a gas feed rate of 300 cc/minute, in accordance with the procedure described in Example I. Then the catalyst was kept at ambient conditions for 2 days and was retested under the above testing conditions, with no additional prior treatment. Thereafter, the catalyst was heated in hydrogen at 100° C. for 1 hour and was tested again under the testing conditions described above. Test results are summarized in Table III.

TABLE III

| Run | Catalyst | Run Time (Hour) | % Conversion of CO | Conversion of cc CO per Minute |
|---|---|---|---|---|
| 5 | E | 1 | 33.9 | 1.20 |
|  |  | 2 | 32.2 | 1.14 |
|  |  | 4 | 29.7 | 1.05 |
|  |  | 6 | 27.1 | 0.96 |
|  |  | 8 | 25.4 | 0.90 |
|  |  | 10 | 24.6 | 0.87 |
|  |  | 12 | 23.7 | 0.84 |
|  |  | 14 | 22.9 | 0.81 |
|  |  | 16 | 22.0 | 0.78 |
|  |  | 18 | 22.0 | 0.78 |
|  |  | 20 | 21.2 | 0.75 |
|  |  | 22 | 21.2 | 0.75 |
|  |  | 24 | 21.2 | 0.75 |
| 6 | E, used in Run 5, left out for 2 days | 1 | 9.3 | 0.33 |
|  |  | 2 | 9.3 | 0.33 |
|  |  | 4 | 9.3 | 0.33 |
|  |  | 7 | 9.3 | 0.33 |
| 7 | E, used in Run 6, heated in H$_2$ at 100° C. for 1 hour | 1 | 26.3 | 0.93 |
|  |  | 2 | 22.9 | 0.81 |
|  |  | 4 | 22.9 | 0.81 |
|  |  | 6 | 22.9 | 0.81 |
|  |  | 9 | 22.9 | 0.81 |

Test results in Table III indicate that used Pt/Fe/ZrO$_2$ catalysts of this invention substantially lost that catalytic activity when exposed to air, but were reactivated by reducing treatment in hydrogen.

EXAMPLE V

This example illustrates the performance of zirconia-supported catalysts which were prepared substantially in accordance with the procedures described in Example II.

Catalyst F contained 2 weight-% Pt, and was prepared in accordance with the procedure for Catalyst B, except that no Fe was present and heating in H$_2$ at 200° C. was carried out for 2 hours.

Catalyst G contained 2 weight-% Pd, and was prepared in accordance with the procedure for Catalyst B, except that Pd(NH$_3$)$_4$(NO$_3$)$_2$ was used in lieu of Pt(NH$_3$)$_4$(NO$_3$)$_2$, no Fe was present, and heating in H$_2$ at 200° C. was carried out for 2 hours.

Catalyst H contained 2 weight-% Fe and was prepared in accordance with the procedure for Catalyst B, except that Pd(NH$_3$)$_4$(NO$_3$)$_2$ was used and heating H$_2$ at 200° C. was carried out for 2 hours.

Catalysts F, G and H were tested for CO oxidation activity, using the experimental set-up and gas feed described in Example I. Test results are summarized in Table IV.

TABLE IV

| Catalyst | Run Time (Hour) | Temp. (°C.) | Feed Rate (cc/min) | Conversion of CO (cc CO/Minute) |
|---|---|---|---|---|
| F | 1 | 23 | 30 | 0.02 |
|  | 2 | 23 | 30 | 0.02 |
|  | 4 | 50 | 30 | 0.04 |
|  | 6 | 50 | 30 | 0.04 |
|  | 8 | 50 | 30 | 0.04 |
|  | 10 | 100 | 70 | 0.36 |
|  | 12 | 100 | 70 | 0.35 |
|  | 14 | 100 | 70 | 0.34 |
|  | 16 | 100 | 70 | 0.33 |
|  | 18 | 100 | 70 | 0.33 |
|  | 20 | 100 | 70 | 0.33 |
|  | 24 | 100 | 70 | 0.33 |
| G | 1 | 23 | 20 | 0.01 |
|  | 2 | 23 | 20 | 0.01 |
|  | 4 | 50 | 20 | 0.03 |
|  | 6 | 50 | 20 | 0.03 |
|  | 8 | 50 | 20 | 0.03 |
|  | 10 | 100 | 50 | 0.43 |
|  | 12 | 100 | 50 | 0.39 |
|  | 14 | 100 | 50 | 0.37 |
|  | 16 | 100 | 50 | 0.34 |
|  | 18 | 100 | 50 | 0.33 |
|  | 20 | 100 | 50 | 0.31 |
|  | 24 | 100 | 50 | 0.30 |
| H | 1 | 23 | 20 | 0.07 |
|  | 2 | 23 | 20 | 0.05 |
|  | 4 | 50 | 20 | 0.09 |
|  | 6 | 50 | 20 | 0.09 |
|  | 8 | 50 | 20 | 0.08 |
|  | 10 | 100 | 80 | 0.67 |
|  | 12 | 100 | 80 | 0.62 |
|  | 14 | 100 | 80 | 0.58 |
|  | 16 | 100 | 80 | 0.53 |
|  | 18 | 100 | 80 | 0.49 |
|  | 20 | 100 | 80 | 0.47 |
|  | 24 | 100 | 80 | 0.46 |

Test results in Table IV show that Pt/ZrO$_2$ and Pd/ZrO$_2$ had comparable CO oxidation catalyst activity. Furthermore, Fe was an effective copramotor for a Pd/ZrO$_2$ catalyst.

EXAMPLE VI

A test employing a catalyst, which contained 1 weight-% Pt on SiO$_2$ and had been pretreated in H$_2$ at 660° C. for about 1 hour, showed no activity for catalyzing the oxidation of CO at room temperature. Thus, it is preferred that SiO$_2$ is substantially absent from the catalyst of this invention.

Reasonable variations, modifications and adaptations for various usages and conditions can be made within the scope of the disclosure and the appended claims, without departing from the scope of this invention.

That which is claimed is:

1. A composition of matter consisting essentially of (i) a support material consisting essentially of zirconia, (ii) at least one noble metal selected from the group consisting of platinum and palladium, and (iii) iron oxide; wherein said composition of matter is active as a catalyst for the oxidation of carbon monoxide with free oxygen to carbon dioxide at a temperature of about 25°–30° C., and said composition of matter contains components (ii) and (iii) in such amounts that component (iii) is effective as compromoter for component (ii) on said support material in said oxidation at said temperature.

2. A composition of matter in accordance with claim 1, wherein component (ii) is platinum metal.

3. A composition of matter in accordance with claim 2 comprising about 0.5–5 weight-% Pt and about 0.2–4 weight-% Fe.

4. A composition of matter in accordance with claim 1, wherein component (ii) is palladium metal.

5. A composition of matter in accordance with claim 4 comprising about 0.5-5 weight-% Pd and about 0.2-4 weight-% Fe.

6. A composition of matter in accordance with claim 1, wherein component (ii) is platinum metal and palladium metal.

7. A composition of matter in accordance with claim 6 comprising about 0.5-5 weight-% (Pt+Pd) and about 0.2-4 weight-% Fe.

8. A composition of matter consisting essentially (i) a support material consisting essentially of zirconia-coated porous ceramic material, (ii) at least one noble metal selected from the group consisting of platinum and palladium, and (iii) iron oxide;

wherein said composition of matter is active as a catalyst for the oxidation of carbon monoxide with free oxygen to carbon dioxide at a temperature of about 25°-30° C., and said composition of matter contains components (ii) and (iii) in such amounts that component (iii) is effective as copromoter for component (ii) on said support material in said oxidation at said temperature.

9. A composition of matter in accordance with claim 8, wherein component (ii) is platinum metal.

10. A composition of matter in accordance with claim 9, wherein said composition of matter, excluding said porous ceramic material, comprises about 0.5-5 weight-% Pt and about 0.2-4 weight-% Fe.

11. A composition of matter in accordance with claim 9, wherein said porous ceramic material is a monolith.

12. A composition of matter in accordance with claim 11, wherein said composition of matter, excluding said monolith, comprises about 0.5-5 weight-% Pt and about 0.2-4 weight-% Fe.

13. A composition of matter in accordance with claim 9, wherein component (i) contains about 1-40 weight-% $ZrO_2$.

14. A composition of matter in accordance with claim 8, wherein component (ii) is palladium metal.

15. A composition of matter in accordance with claim 14, wherein said composition of matter, excluding said porous ceramic material, comprises about 0.5-5 weight-% Pd and about 0.2-4 weight-% Fe.

16. A composition of matter in accordance with claim 14, wherein said porous ceramic material is a monolith.

17. A composition of matter in accordance with claim 16, wherein said composition of matter, excluding said monolith, comprises about 0.5-5 weight-% Pd and about 0.2-4 weight-% Fe.

18. A composition of matter in accordance with claim 14, wherein component (i) contains about 1-40 weight-% $ZrO_2$.

19. A composition of matter in accordance with claim 8, wherein component (ii) is platinum metal and palladium metal.

20. A composition of matter in accordance with claim 19, wherein said composition of matter, excluding said porous ceramic material, comprises about 0.5-5 weight-% (Pt+Pd) and about 0.2-4 weight-% Fe.

21. A composition of matter in accordance with claim 19, wherein said porous ceramic material is a monolith.

22. A composition of matter in accordance with claim 21, wherein said composition of matter, excluding said monolith, comprises 0.5-5 weight-% (Pt+Pd) and about 0.2-4 weight-% Fe.

23. A composition of matter in accordance with claim 19, wherein component (i) contains about 1-40 weight-% $ZrO_2$.

24. A process for preparing a composition of matter consisting essentially of (i) a support material consisting essentially of zirconia, (ii) at least one noble metal selected from the group consisting of platinum and palladium, and (iii) iron oxide;

wherein said composition of matter is active as a catalyst for the oxidation of carbon monoxide with free oxygen to carbon dioxide at a temperature of about 25°-30° C., and said composition of matter contains components (ii) and (iii) in such amounts that component (iii) is effective as copromoter for component (ii) on said support material in said oxidation at said temperature;

said process comprising the steps of:
(a) contacting said support material (i) with a solution comprising at least one compound of at least one noble metal selected from the groups consisting of platinum and palladium and at least one compound of iron;
(b) heating the material obtained in step (a) under such conditions as to substantially dry said material obtained in step (a), to at least partially convert said at least one compound of at least one noble metal to at least one substance selected from the group consisting of oxides of Pt, oxides of Pd, Pt metal and Pd metal, and to at least partially convert said at least one compound of iron to iron oxide; and
(c) treating the material obtained in step (b) with a reducing gas at a temperature in the range of from about 100 to about 600° C., under such conditions as to obtain said composition of matter.

25. A process in accordance with claim 24, wherein step (b) is carried out in two sub-steps:
(b1) heating the material obtained in step (a) at a first temperature so as to remove substantially all liquids from said material obtained in step (a), and
(b2) heating the substantially dried material obtained in step (b1) at a second temperature, which is higher than said first temperature, so as to at least partially convert said at least one compound of at least one noble metal to at least one of oxides of Pt, oxides of Pd, metallic Pt and metallic Pd, and to at least partially convert said at least one component of iron to iron oxide.

26. A process in accordance with claim 25, wherein said first temperature is in the range of from about 30° to about 200° C., and said second temperature is in the range of from about 300° to about 700° C.

27. A process in accordance with claim 24, wherein said at least one noble metal is platinum.

28. A process in accordace with claim 27, wherein step (c) is carried out with free hydrogen at a temperature of about 300°-500° C. for about 0.5-20 hours.

29. A process in accordance with claim 27, wherein steps (a), (b) and (c) are repeated.

30. A process in accordance with claim 24, wherein said at least one noble metal is palladium.

31. A process in accordance with claim 30, wherein reducing step (c) is carried out with free hydrogen at a temperature of about 300°-500° C. for about 0.5-20 hours.

32. A process in accordance with claim 30, wherein steps (a), (b) and (c) are repeated.

33. A process in accordance with claim 24, wherein step (a) is carried out with compounds of platinum and of palladium.

34. A process in accordance with claim 33, wherein reducing step (c) is carried out with free hydrogen at about 300°-500° C. for about 0.5-20 hours.

35. A process in accordance with claim 33, wherein steps (a), (b) and (c) are repeated.

36. A process for preparing a composition of matter consisting essentially of (i) a support material consisting essentially of zirconia, (ii) at least one noble metal selected from the group consisting of platinum and palladium, and (iii) iron oxide;
wherein said composition of matter is active as a catalyst for the oxidation of carbon monoxide with free oxygen to carbon dioxide at a temperature of about 25°-30° C., and said composition of matter contains components (ii) and (iii) in such amounts that component (iii) is effective as copromoter for component (ii) on said support material in said oxidation at said temperature;
said process comprising the steps of;
(a) contacting said support material with a solution comprising at least one compound of at least one noble metal selected from the group consisting of platinum and palladium;
(b) heating the material obtained in step (a) under such conditions as to substantially dry said material obtained in step (a) and to at least partially convert said at least one compound of at least one noble metal to at least one substance selected from the group consisting of oxides of Pt, oxides of Pd, Pt metal and Pd metal;
(a*) impregnating the material obtained in step (b) with a solution comprising at least one compound of iron;
(b*) heating the material obtained in step (a*) under such conditions as the substantially dry said material obtained in step (a*) and to at least partially convert said at least one compound of iron to at least one oxide of iron; and
(c) treating the material obtained in step (b*) with a reducing gas at a temperature in the range of from about 100° to about 600° C., under such conditions as to obtain said composition of matter.

37. A process in accordance with claim 36, wherein step (b) is carried out in two sub-steps:
(b1) heating the material obtained in step (a) at a first temperature so as to remove substantially all liquids from said material obtained in step (a), and
(b2) heating the substantially dried material obtained in step (b1) at a second temperature, which is higher than said first temperature, so as to at least partially convert said at least one compound of at least one noble metal to at least one of oxides of Pt, oxides of Pd, metallic Pt and metallic Pd.

38. A process in accordance with claim 37, wherein said first temperature is in the range of from about 30° to about 200° C., and said second temperature is in the range of from about 300° to about 700° C.

39. A process in accordance with claim 36, wherein said at least one noble metal is platinum.

40. A process in accordance with claim 39, wherein reducing step (c) is carried out with free hydrogen at a temperature of about 300°-500° C. for about 0.5-20 hours.

41. A process in accordance with claim 36, wherein said at least one noble metal is palladium.

42. A process in accordance with claim 41, wherein reducing step (c) is carried out with free hydrogen at about 300°-500° C. for about 0.5-20 hours.

43. A process in accordance with claim 36, wherein step (a) is carried out with compounds of platinum and of palladium.

44. A process in accordance with claim 43, wherein reducing step (c) is carried out with free hydrogen at about 300°-500° C. for about 0.5-20 hours.

45. A process for preparing a composition of matter consisting essentially of (i) a support material consisting essentially of zirconia-coated porous ceramic material, (ii) at least one noble metal selected from the group consisting of platinum and palladium, and (iii) iron oxide;
wherein said composition of matter is active as a catalyst for the oxidation of carbon monoxide with free oxygen to carbon dioxide at a temperature of about 25°-30° C., and said composition of matter contains components (ii) and (iii) in such amounts that component (iii) is effective as copromoter for component (ii) on said support material in said oxidation at said temperature;
said process comprising the steps of;
(A) impregnating a porous ceramic material with a solution of a zirconium compound;
(B) heating the impregnated material obtained in step (A) under such conditions as to substantially decompose said zirconium compound to zirconia and to obtain a substantially dried zirconia-coated porous ceramic material;
(C) contacting the material obtained in step (B) with a solution comprising at least one compoud of at least one noble metal selected from the group consisting of platinum and palladium and at least one compound of iron;
(D) heating the material obtained in step (C) under such conditions as to substantially dry the material obtained in step (C), to at least partially convert said at least one compound of at least one noble metal to at least one substance selected from the group consisting of oxides of Pt, oxides of Pd, Pt metal and Pd metal, and to at least partially convert said at least one compound of iron to iron oxide; and
(E) treating the material obtained in step (D) with a reducing gas, at a temperature in the range of from about 0° about 400° C., under such conditions as to obtain said composition of matter.

46. A process in accordance with claim 45, wherein step (D) is carried out in two sub-steps:
(D1) heating the material obtained in step (C) at a first temperature so as to remove substantially all liquids from said material obtained in step (C), and
(D2) heating the substantially dried material obtained in step (D1) at a second temperature, which is higher than said first temperature, so as to at least partially convert said at least one compound of at least one noble metal to at least one of oxides of Pt, oxides of Pd, metallic Pt and metallic Pd, and to at least partially convert said at least one component of iron to iron oxide.

47. A process in accordance with claim 46, wherein said first temperature is in the range of from about 30° to about 200° C., said second temperature is in the range of from about 300° to about 700° C., and the temperature in drying step (B) is in the range of from about 30° to about 200° C.

48. A process in accordance with claim 45, wherein said at least one noble metal is platinum.

49. A process in accordance with claim 48, wherein said solution used in step (A) is an aqueous solution of $ZrO(NO_3)_2$.

50. A process in accordance with claim 48, wherein said porous ceramic material used in step (A) is a monolith material.

51. A process in accordance with claim 48, wherein said solution used in step (A) comprises about 0.1-30 weight-% Zr, and the $ZrO_2$-coated material obtained in step (B) contains about 1-40 weight-% $ZrO_2$.

52. A process in accordance with claim 48, wherein reducing step (E) is carried out with free hydrogen at a temperature of about 20°-200° C. for about 0.5-20 hours.

53. A process in accordance with claim 45, wherein said at least one noble metal is palladium.

54. A process in accordance with claim 53, wherein said solution used in step (A) is an aqueous solution of $ZrO(NO_3)_2$.

55. A process in accordance with claim 53, wherein said porous ceramic material used in step (A) is a monolith material.

56. A process in accordance with claim 53, wherein said solution used in step (A) comprises about 0.1-30 weight-% Zr, and the $ZrO_2$-coated material obtained in step (B) contains about 1-40 weight-% $ZrO_2$.

57. A process in accordance with claim 53, wherein reducing step (E) is carried out with free hydrogen at a temperature of about 20°-200° C. for about 0.5-20 hours.

58. A process in accordance with claim 45, wherein compounds of platinum and of palladium are used in step (C).

59. A process in accordance with claim 58, wherein said solution used in step (A) is an aqueous solution of $ZrO(NO_3)_2$.

60. A process in accordance with claim 58, wherein said porous ceramic material used in step (A) is a monolith material.

61. A process in accordance with claim 58, wherein said solution used in step (A) comprises about 0.1-30 weight-% Zr, and the $ZrO_2$-coated material obtained in step (B) contains about 1-40 weight-% $ZrO_2$.

62. A process in accordance with claim 58, wherein reducing step (E) is carried out with free hydrogen at a temperature of about 20°-200° C. for about 0.5-20 hours.

63. A process for preparing a composition of matter consisting essentially of (i) a support material consisting essentially of zirconia-coated porous ceramic material, (ii) at least one noble metal selected from the group consisting of platinum and palladium, and (iii) iron oxide;

wherein said composition of matter is active as a catalyst for the oxidation of carbon monoxide with free oxygen to carbon dioxide at a temperature of about 25°-30° C., and said composition of matter contains components (ii) and (iii) in such amounts that component (iii) is effective as copromoter for component (ii) on said support material in said oxidation at said temperature;

said process comprising the steps of;

(A) impregnating a porous ceramic material with a solution of a zirconium compound;

(B) heating the impregnated material obtained in step (A) under such conditions as to substantially decompose said zirconium compound to zirconia and to obtain a substantially dried zirconia-coated porous ceramic material (C) contacting the material obtained in step (B) with a solution comprising at least one dissolved compound of at least one noble metal selected from the group consisting of platinum and palladium;

(D) heating the material obtained in step (C) under such conditions as to substantially dry the material obtained in step (C) and to at least partially convert said at least one compound of at least one noble metal to at least one substance selected from the group consisting of oxides of Pt, oxides of Pd, Pt metal and Pd metal;

(C*) impregnating the material obtained in step (D) with a solution comprising at least one compound of iron;

(D*) heating the material obtained in step (C*) under such conditions as to substantially dry said material obtained in step (C*) and to at least partially convert said at least one compound of iron to at least one oxide of iron; and (E) treating the material obtained in step (D*) with a reducing gas at a temperature in the range of from about 0° to about 300° C., under such conditions as to obtain said composition of matter.

64. A process in accordance with claim 63, wherein step (D) is carried out in two sub-steps:

(D1) heating the material obtained in step (C) at a first temperature so as to remove substantially all liquids from said material obtained in step (C), and (D2) heating the substantially dried material obtained in step (D1) at a second temperature, which is higher than said first temperature, so as to at least partially convert said at least one compound of at least one noble metal to at least one of oxides of Pt, oxides of Pd metallic Pt and metallic Pd.

65. A process in accordance with claim 64, wherein said first temperature is in the range of from about 30° to about 200° C., said second temperature is in the range of from about 300° to about 700° C., and the temperature in drying step (B) is in the range of from about 30° to about 200° C.

66. A process in accordance with claim 63, wherein said at least one noble metal is platinum.

67. A process in accordance with claim 66, wherein said solution used in step (A) is an aqueous solution of $ZrO(NO_3)_2$.

68. A process in accordance with claim 66, wherein said solution used in step (A) comprises about 0.1-30 weight-% Zr, and the $ZrO_2$-coated material obtained in step (B) contains about 1-40 weight-% $ZrO_2$.

69. A process in accordance with claim 66, wherein said porous ceramic material used in step (A) is a monolith material.

70. A process in accordance with claim 66, wherein reducing step (E) is carried out with free hydrogen at a temperature of about 20°-200° C. for about 0.5-20 hours.

71. A process in accordance with claim 63, wherein said at least one noble metal is palladium.

72. A process in accordance with claim 71, wherein said solution used in step (A) is an aqueous solution of $ZrO(NO_3)_2$.

73. A process in accordance with claim 71, wherein said solution used in step (A) comprises about 0.1-30 weight-% Zr, and the ZrO$_2$-coated material obtained in step (B) contains about 1-40 weight-% ZrO$_2$.

74. A process in accordance with claim 71, wherein said porous ceramic material used in step (A) is monolith material.

75. A process in accordance with claim 71, wherein reducing step (E) is carried out with free hydrogen at a temperature in the range of from about 20°-200° C. for about 0.5-20 hours.

76. A process in accordance with claim 63, wherein compounds of platinum and of palladium are used in step (C).

77. A process in accordance with claim 76, wherein said solution used in step (A) is an aqueous solution of ZrO(NO$_3$)$_2$.

78. A process in accordance with claim 76, wherein said solution used in step (A) comprises about 0.1-30 weight-% Zr, and the ZrO$_2$-coated material obtained in step (B) contains about 1-40 weight-% ZrO$_2$.

79. A process in accordance with claim 76, wherein said porous ceramic material used in step (A) is a monolith material.

80. A process in accordance with claim 76, wherein reducing step (E) is carried out with free hydrogen at a temperature of about 20°-200° C. for about 0.5-20 hours.

* * * * *